No. 731,186. PATENTED JUNE 16, 1903.
S. T. HUTCHINSON & F. W. McNEIR.
MUSIC LEAF TURNER.
APPLICATION FILED JAN. 15, 1903.
NO MODEL. 2 SHEETS—SHEET 1.
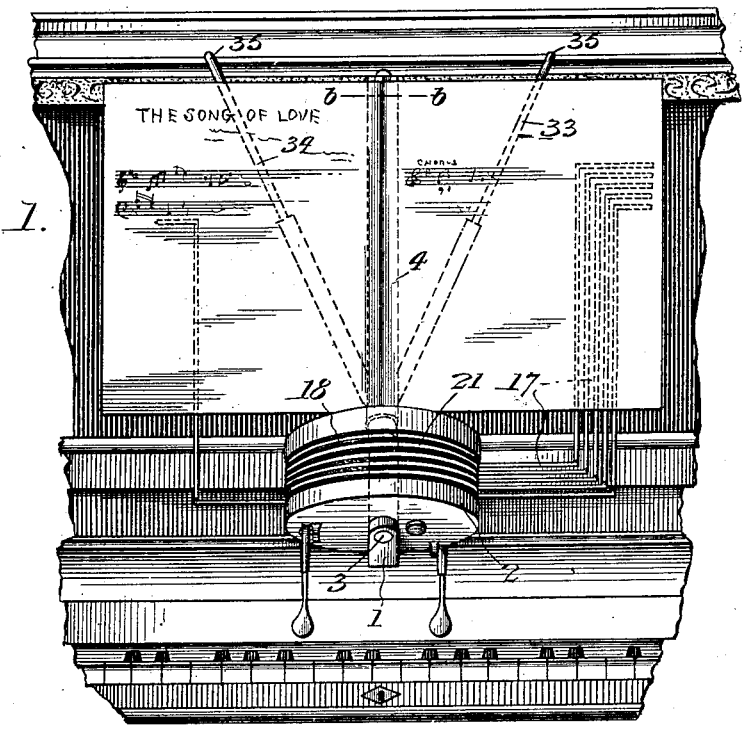
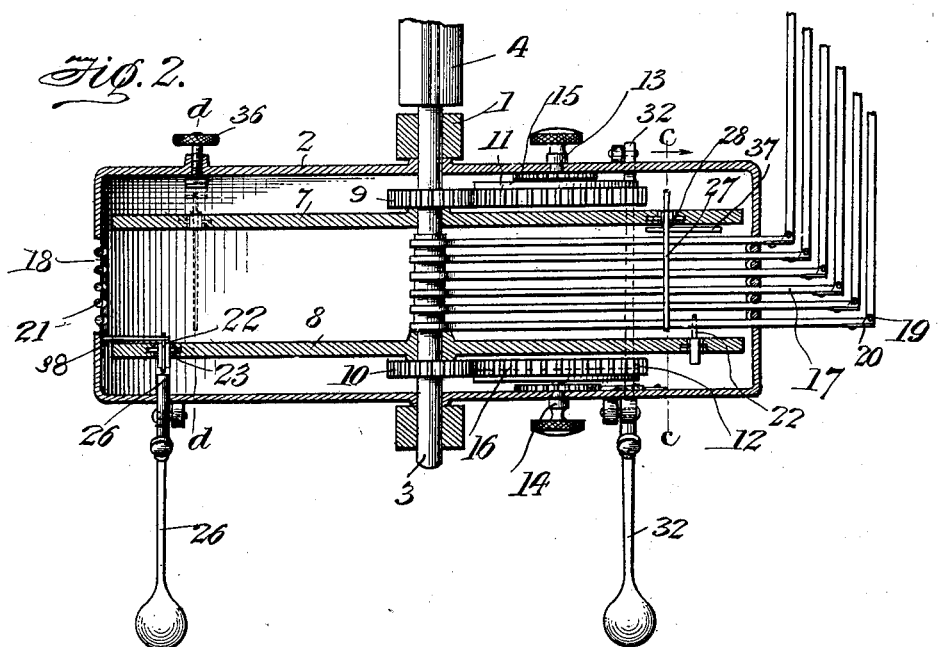

No. 731,186. PATENTED JUNE 16, 1903.
S. T. HUTCHINSON & F. W. McNEIR.
MUSIC LEAF TURNER.
APPLICATION FILED JAN. 15, 1903.
NO MODEL. 2 SHEETS—SHEET 2.
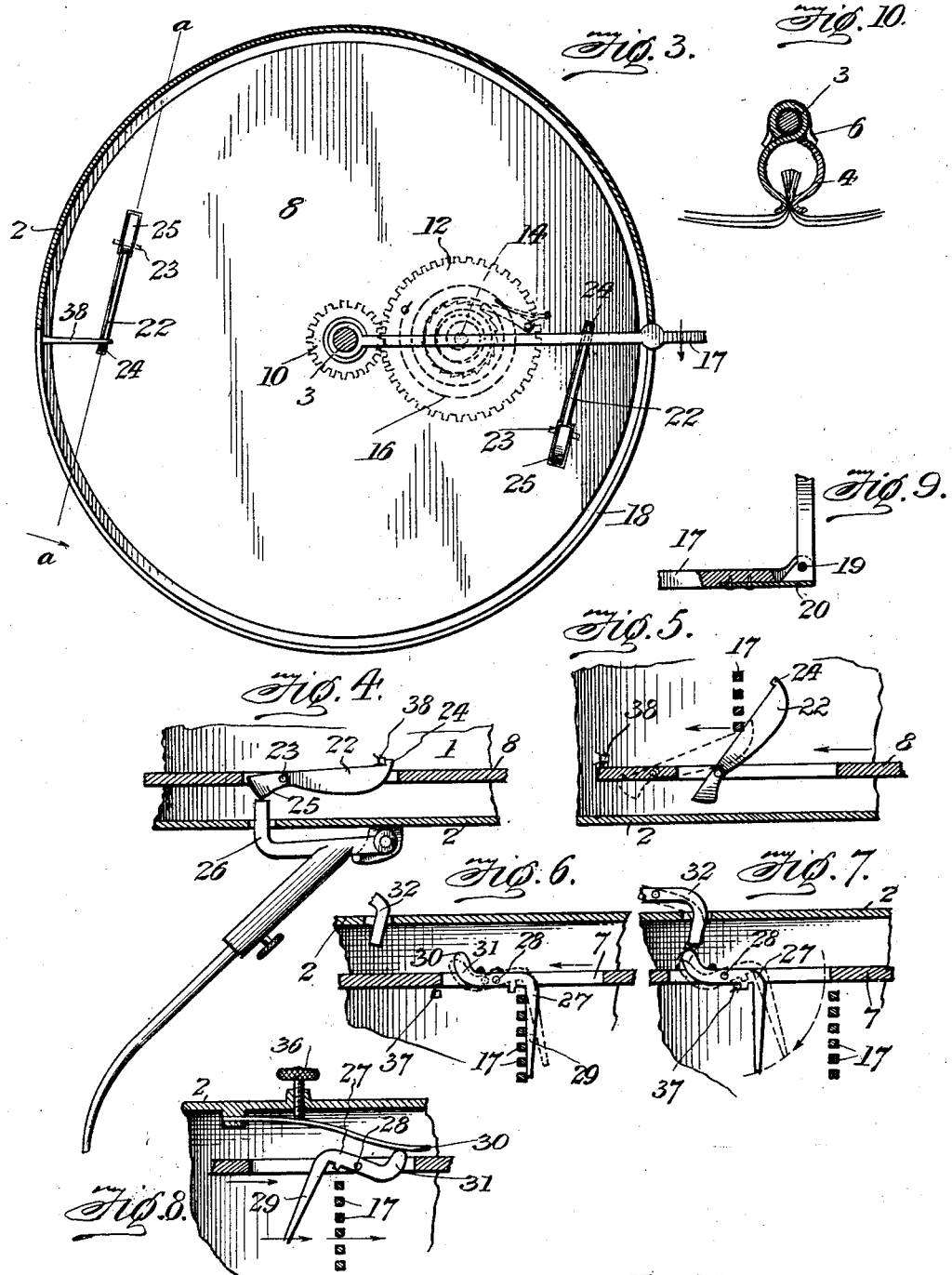

No. 731,186.

Patented June 16, 1903.

UNITED STATES PATENT OFFICE.

SEARCY T. HUTCHINSON AND FOREST W. McNEIR, OF SAN ANTONIO, TEXAS.

MUSIC-LEAF TURNER.

SPECIFICATION forming part of Letters Patent No. 731,186, dated June 16, 1903.

Application filed January 15, 1903. Serial No. 139,189. (No model.)

*To all whom it may concern:*

Be it known that we, SEARCY T. HUTCHINSON and FOREST W. McNEIR, citizens of the United States, residing at San Antonio, in the county of Bexar and State of Texas, have invented a new and useful Music-Leaf Turner, of which the following is a specification.

This invention relates to music-leaf turners, and has for its objects to produce a device of this character which will be comparatively simple of construction and inexpensive to manufacture, efficient in operation, and one which will be automatic in its action, subject to the control of the operator.

To these ends the invention comprises in a music-leaf turner the combination, with a casing, of a shaft mounted thereon, a pair of disks mounted on the shaft and adapted to be rotated, a leaf-turning arm also mounted on the shaft and operable by the disks, and means controlled by the operator for automatically rotating the disks.

The invention further comprises the details of construction and combination of parts more fully hereinafter described.

In the accompanying drawings, Figure 1 is a perspective view of the device constructed in accordance with the invention and shown applied to an instrument. Fig. 2 is a vertical sectional elevation through the same, the casing and rotary disks being shown in section and the finger carried by the upper disk turning the arms simultaneously, the view illustrating the position of the parts at the completion of the turning movement. Fig. 3 is a horizontal sectional view of the same. Fig. 4 is a detailed sectional elevation on the line $a\,a$ of Fig. 3 as viewed in the direction of the arrow, showing one of the fingers carried by the lower disk in engagement with the stop to prevent rotation of the disk. Fig. 5 is a similar view showing one of the fingers in the act of engaging a leaf-turning arm for shifting the same, the direction of rotation of the disk being indicated by the arrow. Fig. 6 is a similar view on the line $c\,c$ of Fig. 2 looking in the direction of the arrow, showing the arm carried by the upper disk in the act of shifting all of the arms, the arms having reached the limit of their movement, the direction of rotation of the disk being indicated by the arrow. Fig. 7 is a similar view illustrating the finger as having passed the arms and in engagement with the stop for locking the disk against rotation, the operation of the lever for releasing the finger from the stop being indicated by dotted lines. Fig. 8 is a similar view on the line $d\,d$ of Fig. 2, showing the finger carried by the upper disk in the act of engaging a predetermined number of the arms for shifting the same, the parts being shown at the beginning of the shifting operation, with the overlying leaf-spring adjusted to control the number of arms to be engaged by the finger, the direction of rotation of the disk being indicated by the arrows. Fig. 9 is a detailed view of the joint in the music-turning arms. Fig. 10 is a detailed horizontal section on the line $b\,b$ of Fig. 1.

Referring to the drawings, 1 indicates the stock or framework of the device, preferably of U form in side elevation, as shown, and 2 is a suitable casing sustained thereby.

3 is a rod or shaft sustained by the framework and extending centrally through the casing and for a considerable distance above the same to receive and support the music-clamp 4. The clamp 4 comprises two spring-jaws pivoted on the rod 3 and controlled by a torsion-spring 6, also mounted on the rod and tending to maintain the jaws normally closed.

Mounted upon the shaft 3 and within the casing 2 are two disks 7 and 8, mounted loosely for rotation. Secured to or otherwise suitably formed upon the outer faces of the disks are suitable gears 9 and 10 in mesh with hollow toothed drums 11 and 12, respectively. The drums 11 and 12, which are sustained by shafts 13 and 14, mounted in the casing, are hollow and contain spiral springs 15 and 16, adapted when wound to rotate the drums for operating the disks. Both of the shafts 13 and 14 are provided at their ends outside of the casing with suitable keys for winding the springs in the drums.

17 indicates a series of leaf-turning arms, preferably six in number, mounted upon the shaft 3 for rotation. These arms project horizontally through an opening 18, formed in the side wall of the casing, thence vertically upward, and have their upper ends formed into or provided with horizontally-extending fingers. The vertical portions of the arms are pivoted to the lower horizontal portions, as at 19, the said horizontal portions being provided with suitable springs 20, whereby the arms will be suitably sustained whether they occupy their vertical positions or are turned down to a horizontal position in order to insert them between the music-sheets.

21 indicates suitable guides, preferably in the form of wires, extending horizontally around the casing 2 between the horizontal portions of the fingers 17 and serve to suitably space the arms apart and to guide them in their movements.

22 is a weighted finger pivoted, as at 23, in the lower disk 8. One end of this finger projects above the upper surface of the disk and is provided with a tip 24, while the other end of the finger is provided with a projection 25, which extends below the under face of the disk in position to be engaged by an operating-key 26 for the purpose to be presently explained. The disk is provided with two of the fingers, which are identical in construction and operation and are pivoted in the disk at diametrically opposite points for the purpose which will presently appear.

27 is a finger pivoted, as at 28, in the disk 7 and provided with a right-angularly-disposed portion 29, which extends by gravity below the under surface of the disk, and at its opposite end with a cam-face 30, formed on a shoulder 31, which projects above the upper face of the disk in position to be engaged by an operating-key 32.

33 and 34 are two arms pivoted in the frame 1 and provided at their upper ends with hooks (not shown) adapted to be engaged over the music-board of a piano for sustaining the device in position. These arms are telescopic, enabling them to be adjusted as circumstances may require. The key-rods 26 and 32 are also telescopic to permit their ready adjustment.

36 is a set-screw mounted in the wall of the casing 2 and controls an underlying leaf-spring suitably mounted in position to be engaged by the finger 27 for the purpose to be presently explained.

37 is a stop projecting from the side of the casing in position to be engaged by the finger 27 and prevent rotation of the disk 7, while 38 is a similar stop adapted to be engaged by either of the fingers 22 to prevent rotation of the drum 8.

The operation of the device is as follows: The music is inserted into the clamp 4 and the arms 19 are adjusted between the leaves. The springs in the drums 11 and 12 are then wound to impart motion to the disks 7 and 8 through the medium of the gear connection between the disks and drums. The disks are, however, prevented from rotation by one of the fingers 22 and the finger 27 engaging their respective stops 38 37 on the casing. In this position of the parts if the operator desires to turn a leaf from right to left he actuates the key 26, which forces the projection 25 on the finger 22 upward, thus releasing the tip 24 of the finger from its stop 38, and permits the disk 8 to rotate from right to left, as indicated by the arrows in Figs. 3 and 5, thus turning the music one leaf at a time as often as the key 26 is operated. When one of the fingers 22 is in engagement with the stop 38 for preventing rotation of the drum, the other finger will stand substantially vertical in position for engagement with the arms 17, and when the key 26 is actuated to release the finger 22 which is in engagement with the stop the companion finger 22 will swing downward, as indicated in Fig. 5, until its tip 24 engages the lower arm of the series, as indicated by dotted lines in said figure. The drum will then rotate to shift the arm from right to left, and at the end of the shifting movement the finger 22 will be released from the arm, owing to the latter contacting with the casing, and will engage the stop 38, while the other finger 22 has in the meantime traveled to position for engaging the next arm of the series to be shifted. This operation is repeated as often as desired until all the leaves have been turned. Now if the operator wishes to return the leaves he actuates the key 32, which releases finger 27 from its stop 37 and permits the disk 7 to rotate, the rotation of the disk 7 being in a direction opposite to that of the disk 38. As the disk 7 rotates the depending portion 29 of its fingers engages the arms 17 and moves them simultaneously in a direction opposite to that in which they were moved by the finger 22. Upon the rotation of the disk 7 the finger 27 just before it reaches the arms 17 at the beginning of the shifting stroke, as illustrated in Fig. 8, moves beneath the leaf-spring controlled by the set-screw 36, and by adjusting the screw the finger may be regulated to shift all of the arms or any number of them, as will be readily understood, in this way permitting the operator to turn the music backward to any desired page. At the end of the shifting operation the arms 17 will abut with the casing at the end of the slot 18 and be stopped, while further rotation of the disk causes the finger 27, which is pivoted to swing freely, to ride upward over the tops of the arms and assume by gravity its normal position after it has passed the arms, so that it may engage with the stop 38, at which time the end 30 will lie beneath the key 32, as clearly illustrated in Fig. 7.

From the foregoing description it will be seen that a device of the character described is produced which combines comparative simplicity of construction, inexpensiveness to manufacture, efficiency in operation, and one in which the action of the device for turning the leaves is automatic, but may be readily controlled by the operator. In attaining these ends we do not limit or confine ourselves to the precise details of construction herein shown and described, as various changes therein may be made without departing from the spirit or scope of the invention.

Having thus described the invention, what is claimed is—

1. In a music-leaf turner, the combination with a casing, of a shaft mounted therein, a pair of disks mounted on the shaft and adapted to be rotated, a leaf-turning arm also mounted on the shaft and operable by the disks, and means controlled by the operator for automatically rotating the disks.

2. In a music-leaf turner, the combination with a casing, of a shaft mounted therein, a pair of disks mounted on the shaft and adapted to be rotated, a leaf-turning arm also mounted on the shaft and operable by the disks, and spring-actuated drums controlled by the operator for automatically rotating the disks.

3. In a music-leaf turner, the combination with a casing, of a shaft mounted therein, a pair of disks mounted on the shaft and adapted to be rotated, a leaf-turning arm also mounted on the shaft and operable by the disks, means for locking the disks, means for releasing the disks and means for automatically rotating the disks when released.

4. In a music-leaf turner, the combination with a casing, of a shaft mounted therein, a pair of disks mounted on the shaft and adapted to be rotated, a leaf-turning arm also mounted on the shaft and operable by the disks, means for locking the disks, means for releasing the disks and spring-actuated drums for rotating the disks when released.

5. In a music-leaf turner, the combination with a casing, of a shaft mounted therein, a pair of disks mounted on the shaft and adapted to be rotated in opposite directions, a leaf-turning arm mounted on the shaft and operable by the disks, means carried by one disk for moving the arm in one direction, means carried by the other disk for moving the arm in the other direction, and means controlled by the operator for independently and automatically rotating the disks.

6. In a music-leaf turner, the combination with a casing, of a shaft mounted therein, a pair of disks mounted on the shaft and adapted to be rotated in opposite directions, a leaf-turning arm mounted on the shaft and operable by the disks, means carried by one disk for moving the arm in one direction, means carried by the other disk for moving the arm in the other direction, and spring-actuated drums controlled by the operator for automatically and independently rotating the disks.

7. In a music-leaf turner, the combination with a casing, of a shaft mounted therein, a pair of disks mounted on the shaft and adapted to be rotated in opposite directions, a leaf-turning arm mounted on the shaft and operable by the disks, means carried by one disk for moving the arm in one direction, means carried by the other disk for moving the arm in the opposite direction, means for locking the disks, means for releasing the disks and means controlled by the operator for automatically and independently rotating the disks when released.

8. In a music-leaf turner, the combination with a casing, of a shaft mounted therein, a pair of disks mounted on the shaft and adapted to be rotated in opposite directions, a leaf-turning arm mounted on the shaft and operable by the disks, means carried by one disk for moving the arm in one direction, means carried by the other disk for moving the arm in the opposite direction, means for locking the disks, means for releasing the disks, and spring-actuated drums controlled by the operator for independently and automatically rotating the disks.

9. In a music-leaf turner, the combination with a casing, of a shaft mounted therein, a pair of disks mounted on the shaft and adapted to be rotated in opposite directions, a plurality of leaf-turning arms mounted on the shaft and operable by the disks, means carried by one disk for moving the arms separately in one direction, means carried by the other disk for moving all or any number of the arms in the opposite direction and means controlled by the operator for automatically rotating the disks.

10. In a music-leaf turner, the combination with a pair of disks adapted to be rotated in opposite directions, of a plurality of leaf-turning arms operable by the disks, means carried by one disk to move the arms separately in one direction, means carried by the other disk and adapted to be adjusted to move all or any number of the arms simultaneously in the opposite direction and spring-actuated drums, controlled by the operator, for automatically rotating the disks.

11. In a music-leaf turner, the combination with a pair of disks adapted to be rotated in opposite directions, of means for operatively supporting the same, a plurality of leaf-turning arms operable by the disks, means carried by one disk to move the arms separately in one direction, means carried by the other disk and adapted to be adjusted to move all or any number of the arms simultaneously in the opposite direction, means for locking the disks, means for releasing the disks, and spring-actuated drums, controlled by the operator, for automatically rotating the disks when released.

12. In a music-leaf turner, the combination with a casing, of a shaft mounted therein, a pair of disks mounted on the shaft and adapted to rotate in opposite directions, a plurality of arms mounted on the shaft and operable by the disks, means carried by one of the disks for moving the arms separately in one direction, means carried by the other disk and adapted to be adjusted for moving all or any number of the arms simultaneously in the opposite direction, and means controlled by
5 the operator for automatically and independently rotating the disks.

In testimony that we claim the foregoing as our own we have hereto affixed our signatures in the presence of two witnesses.

SEARCY T. HUTCHINSON.
FOREST W. McNEIR.

Witnesses:
N. SIMPSON,
A. G. McNEILL.